US006609090B1

(12) United States Patent
Hickman et al.

(10) Patent No.: US 6,609,090 B1
(45) Date of Patent: Aug. 19, 2003

(54) COMPUTER BASED SYSTEM, COMPUTER PROGRAM PRODUCT AND METHOD FOR MANAGING GEOGRAPHICALLY DISTRIBUTED ASSETS

(75) Inventors: Christopher W. Hickman, Los Lunas, NM (US); Theodor E. Kircher, III, Albuquerque, NM (US); Gathen L. Garcia, Rio Rancho, NM (US)

(73) Assignee: Public Service Company of New Mexico, Albuquerque, NM (US)

( * ) Notice: Subject to any disclaimer, the term of this patent is extended or adjusted under 35 U.S.C. 154(b) by 0 days.

(21) Appl. No.: 09/521,962

(22) Filed: Mar. 9, 2000

Related U.S. Application Data
(60) Provisional application No. 60/123,719, filed on Mar. 10, 1999.

(51) Int. Cl.[7] ............................................... G06F 17/20
(52) U.S. Cl. ............................... 704/9; 704/1; 704/270; 704/276; 707/104; 701/208; 705/28
(58) Field of Search ..................... 705/28, 29; 701/200, 701/201, 202, 207, 208, 209, 211, 212, 213, 214, 215; 704/1, 9, 10, 270–276; 707/100–104

(56) References Cited

U.S. PATENT DOCUMENTS

| | | | | |
|---|---|---|---|---|
| 3,702,460 A | * | 11/1972 | Blose ........................ 340/3.1 |
| 4,920,488 A | * | 4/1990 | Filley ........................... 705/28 |
| 5,289,372 A | * | 2/1994 | Guthrie et al. ................ 705/28 |
| 5,528,518 A | * | 6/1996 | Bradshaw et al. ....... 701/208 X |
| 5,646,844 A | * | 7/1997 | Gudat et al. ................ 701/208 |
| 5,714,948 A | * | 2/1998 | Farmakis et al. ........... 340/961 |
| 5,848,373 A | * | 12/1998 | DeLorme et al. ........ 701/208 X |
| 5,930,771 A | * | 7/1999 | Stapp ........................... 705/28 |
| 6,098,050 A | * | 8/2000 | Knoblock et al. ............. 705/28 |
| 6,154,728 A | * | 11/2000 | Sattar et al. .................. 705/28 |
| 6,272,457 B1 | * | 8/2001 | Ford et al. ...................... 704/9 |

FOREIGN PATENT DOCUMENTS

WO    WO-96/07110    * 3/1996    ............. 701/209 X

OTHER PUBLICATIONS

Business Wire, "Intergraph Announces Next Generation Geospatial Resource Management", Apr. 26, 1999.*

Information Technology & Libraries, "Is this a geolibrary? A case of the Idaho Geospatial Data Center", v19n1, pp4–10, Mar. 2000.*

* cited by examiner

*Primary Examiner*—Richard Chilcot
(74) *Attorney, Agent, or Firm*—Oblon, Spivak, McClelland, Maier & Neustadt, P.C.

(57) ABSTRACT

A computer based system, computer program product, and method for managing geographically distributed assets. A computer based system, computer program product, and method are provided for managing geographically distributed electric power transmission assets. Mapping, routing, and asset location information is managed and combined with real time Global Positioning System (GPS) location information to alarm field maintenance and inspection crews prior to inadvertent entry into restricted areas, such as environmentally protected or otherwise restricted lands. Detailed information is maintained on the electric power transmission assets providing management insight into past performance, as well as predictive information as to future costs and performance.

40 Claims, 7 Drawing Sheets

| NAME | POLYGON DEFINITION | PATH ALTERING CATEGORY | PATH TRAVERSAL ALARM INDICATOR | DANGER ALARM INDICATOR |
|---|---|---|---|---|

COMPUTER BASED SYSTEM, COMPUTER PROGRAM PRODUCT AND METHOD FOR MANAGING GEOGRAPHICALLY DISTRIBUTED ASSETS

CROSS REFERENCE TO RELATED APPLICATION

The present document claims the benefit of the earlier filing date of U.S. Provisional patent application Serial No. 60/123,719, entitled "SYSTEM, METHOD AND COMPUTER PROGRAM PRODUCT FOR DISPLAYING INFORMATION FOR SYSTEMS WITH GEOGRAPHICALLY DISTRIBUTED ASSETS," filed in the United States Patent and Trademark Office on Mar. 10, 1999, and having common inventors as the present document, the entire contents of which being incorporated herein by reference.

BACKGROUND OF THE INVENTION

1. Field of the Invention

The present invention is directed to systems, methods, and computer program products for managing geographically distributed assets and more particularly comprehensive systems, methods, and computer program products for both centralized and remote management of geographically distributed assets such as electric power transmission equipment.

2. Discussion of the Background

The management of geographically distributed assets presents many unique problems. The most basic of these problems is maintaining an inventory of the assets. This information includes not only descriptive and locational data, but also historical maintenance and inspection information. Commercially available geographic information systems (GIS) are well suited for maintaining this inventory type information. Geographic information systems are software packages that allow objects stored in the database to have a geographical, or locational component. The GIS application provides both maintenance and display capabilities. One such commercially available GIS application is ESRI's ARC/INFO which provides core GIS capability, ESRI's ARCVIEW GIS is an application that is used for displaying the GIS information at a user's desktop. GIS applications such as ARC/INFO store information in their own proprietary database management system (DBMS) format or can communicate with commercially available DBMSs such as Microsoft Access, ORACLE, or SYBASE.

As presently recognized, a problem with managing geographically distributed assets in a centralized system is configuring an underlying database to accommodate the needs of all potential users of that system. For example, in the case of a system being built to manage electric power transmission equipment, it is desirable that the database contain information that is both useful to those responsible for managing the system, as well as those responsible for inspecting and maintaining the equipment in the field. Furthermore, it is desirable to have all this information in a single database to alleviate the needs for synchronization.

Another problem unique to the management of geographically distributed assets as recognized by the present invention is that there are typically two classes of users of the information being maintained in the system, those responsible for centrally managing the information, and those responsible for remotely maintaining the assets. Given the diverse needs of these two classes of users, commercially available applications do not, per se, satisfy the needs of both. Therefore, it is desirable to have a system that has been tailored to the industry for which it is targeted, taking into account the unique needs of the various users of the system. One such field is the electric power transmission and distribution industry.

Presently, it is difficult to ensure that those responsible for the remote management of the assets have the most current and complete information available. When traveling to remote locations, it is desirable that field engineers and technicians have complete information as to what are the on-site problems that are likely to be encountered, where the assets are located, what is the most efficient route for gaining access to the asset, what are known in-route problems and hazards that might be encountered for the travel route and whether any unique circumstances exist. For example, when traveling to remote areas, it would be helpful to understand any environmental, property ownership, or right-of-way issues that exists. For example, it would be helpful to provide field technicians with accurate information as to their present location as well as information concerning protected environmental areas, sensitive areas such as Indian burial grounds, etc. Without this information, it is possible that the field technicians could inadvertently cause extensive damage to real estate, giving rise to public relations problems. Furthermore, when working in the field, it is desirable to be confident that the information being relied on is accurate and up to date. It is also desirable to have the ability to directly enter information into the system from the field, as work is completed, so as to avoid translation and data entry errors.

On the other hand, it is desirable that those responsible for the central maintenance of the system be able to ensure the integrity and the timeliness of the information maintained in the system. Therefore, it would be desirable for those responsible for the central maintenance of the system to be able to review and approve entries made by the field technicians, so as to serve as a quality check on the integrity of the data.

The present inventors have recognized that there are limitations in the practical application of available systems. The present inventors have also recognized that conventional approaches to managing geographically distributed assets are inadequate in that they do not accommodate the diverse needs of the various users of the information nor inherently able to address the pragmatic issues faced by field technicians as they maintain their systems. Furthermore, the present inventors have recognized that partial solutions to these problems are not likely to be employed by the technicians because they do not offer a complete tool that leverages the information in a way that could be done by a comprehensive system co.

BRIEF SUMMARY OF THE INVENTION

The inventors of the present invention have recognized that currently no methods, systems, or computer program products are available to effectively manage geographically distributed assets from both a central management prospective as well a field perspective. Accordingly, one object of the present invention is to provide a solution to this problem, as well as other problems and deficiencies associated with conventional GIS systems.

The present inventors have also recognized that by providing a comprehensive solution to the management of geographically distributed assets, the information being maintained could be further leveraged to provide efficiencies in managing those assets. For example, by maintaining a single comprehensive and up to date repository of information, this information could, among other uses, be used to predict future failures, maintenance needs, and budgets related to the management of those assets. Accordingly, a further object of the present invention is to provide an ability to use the information being maintained in the system as a management tool.

The inventors of the present invention have also recognized that by making the most recent high quality information available to the field users, the efficiency of the field units could be enhanced. For example, efficient routing information for gaining access to the remote assets could be provided to the field users taking into account all of the constraints maintained within the system. Furthermore, by integrating commercially available Global Positioning System (GPS) capability with the geographic information system and the vehicle's sound system, the system could provide automated alarms to the field users prior to constraints being violated. In the event of an accident or medical emergency, the GPS information provides the best possible location information to insure the fastest response from emergency response personnel. Accordingly, a further object of the present invention is to provide tools to enhance the efficiency of the field users.

To address the above described and other objects, the present inventors have invented a novel computer-based system, method, and computer program product by which geographically distributed assets may be managed using a single comprehensive system tailored to the needs of both the central management user as well as the field user.

In one implementation, the present invention is tailored to the management of geographically distributed electric power transmission equipment. A single repository is maintained that includes information important to both the central management users as well as the field users. The field users have access to the most recent information in the repository while performing field duties. The field users, while in the field, directly input updates to the repository, and those inputs are quality checked prior to their insertion into the central repository. The field units include a laptop computer which provide the field users with routing information (e.g., where to drive, areas to avoid, etc.), and, through a commercially available Global Positioning System receiver, provide real time location information. Also, automated warnings are generated through a vehicle sound system prior to violating property boundaries or other constraints.

As a further feature, the present invention provides a forecasting tool that, among other uses, makes use of the information in the repository to predict future transmission equipment failures, maintenance needs, budgets, etc. Other features and attributes of the system, method, and computer program product include built-in database archiving, web access to the most recent database information, and e-mail notification of proposed changes to data in the repository for authorization.

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein.

DESCRIPTION OF THE PREFERRED EMBODIMENTS

Figure 1:
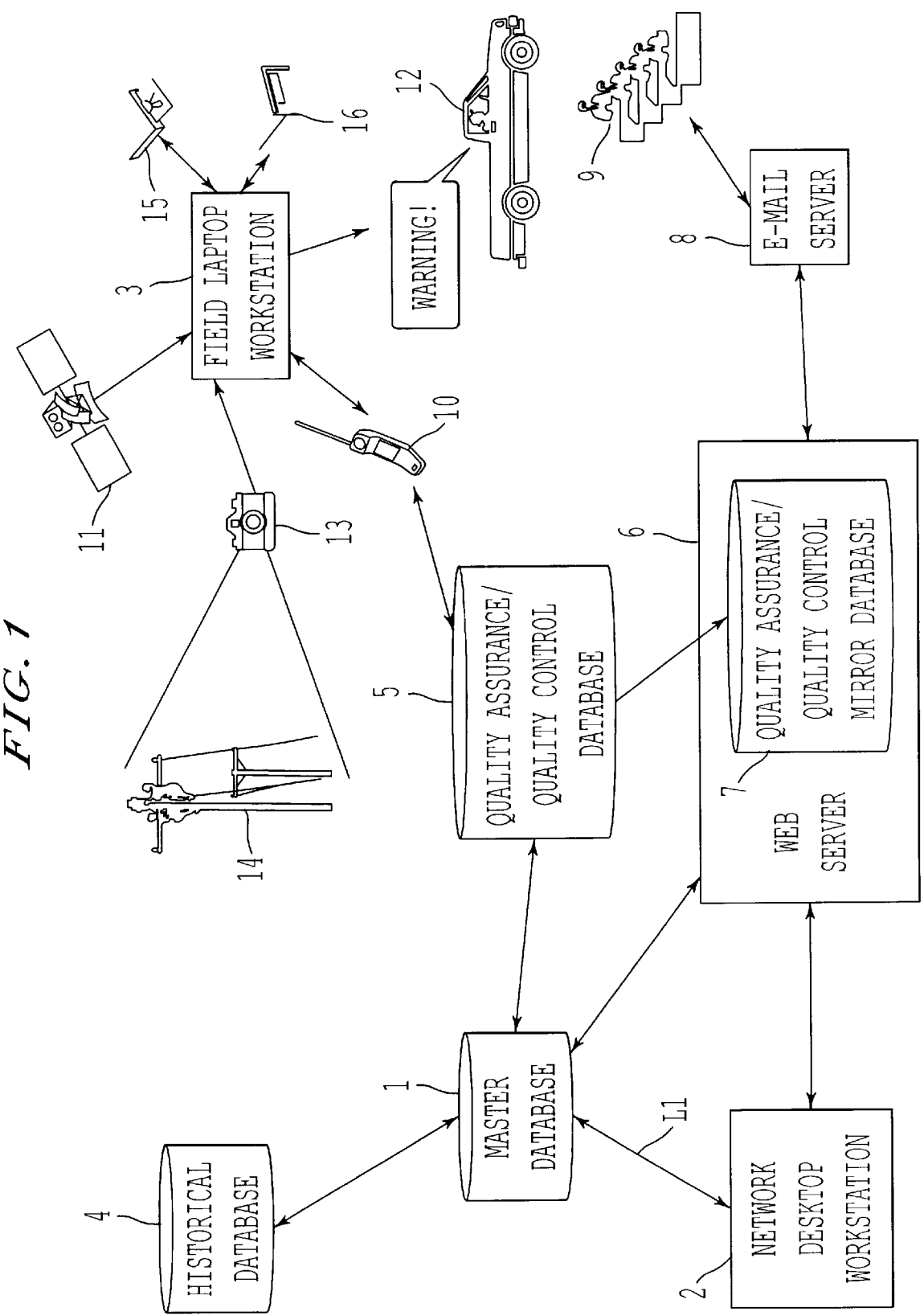
FIG. 1 is a block diagram showing an overall system configuration for one embodiment of the present invention.

Referring now to the figures, wherein like reference numerals are used to identify the same or corresponding elements throughout the several views, FIG. 1 shows an overall system architecture of the present invention.

The present embodiment is discussed in the context of the managing an electric power transmission and distribution system. However, the invention may be used to manage assets of other systems, for example, any business that must manage assets that are geographically distributed such as other utilities (e.g., water or gas) where the information about the assets is of interest to both central management personnel, as well as the field technicians responsible for servicing the assets.

As shown in FIG. 1, the system includes a master database 1 that serves as a central repository for all information regarding the geographically distributed assets. The master database 1 is a commercially available database, such as ACCESS, available from Microsoft Corporation hosted on a computer readable medium. However, other commercially available databases may be used, such as ORACLE, SYBASE, or INFORMIX. In one embodiment, the master database 1 contains all current information of interest on the geographically distributed electric power transmission assets 14 (e.g., transmission lines, poles, maintenance history, etc.). Data in the master database 1 is maintained from a network desktop workstation 2. The network desktop workstation 2 is connected to the master database 1, for example by way of a local area network L1 although other communications links such as a virtual private network, wireless link or Internet-enabled link may be used as well. The desktop workstation 2 interacts with the master database 1 through a software product, one embodiment of which is described by the inventors as "TAMIS". TAMIS is a software application that uses commercially available geographic information system (GIS) software such as ESRI's ARC/INFO and ARCVIEW GIS products. Through the TAMIS application software and the GIS software, the user is able to create, read, update, and delete the information held in the master database 1 from the network desktop workstation 2. The network desktop workstation 2, through the TAMIS application software and the GIS software, gives those users with appropriate access (e.g., password protected) full capability to maintain the information being held in the master database 1. Furthermore, the information being maintained in the master database 1 may be used for management purposes such as reporting, planning, status checking, budget preparation, etc., presented in written report form, video streaming data, graphical display information, as examples.

The master database 1 includes all information pertinent to the management of geographically distributed assets, such as electric power transmission equipment 14. The database may include, but is not limited to, transmission equipment inventory information, maintenance history information, mechanical drawing information describing the assets, digital images of the equipment, as well as geographic location information. Furthermore, detailed geographic information is contained in the master database and maintained by the TAMIS and GIS application software. For example, detailed maps showing the location of the geographically distributed assets are contained in the master database. These detailed geographic maps contain not only locational information of equipment, but also other important geographic, property, right-of-way, and environmental information. For example, the master database 1 contains information that will allow the TAMIS application software and the GIS application software to provide field maintenance crews with detailed routing information describing the most efficient path to take en route to a particular asset. In providing this routing information, the software ensures that the field units are not given a path that will disturb environmentally sensitive land, land with private ownership issues, or other forbidden areas such as Indian burial grounds. To accomplish this, the master database 1 includes the information necessary to define these restricted areas in a format recognizable to the TAMIS and GIS application software. The TAMIS application software and the GIS application software make use of commercially available software such as ESRI's NETWORK ANALYST to determine routing information based on the data in the master database 1. The routing information will allow the field units to perform their duties more efficiently while being aware of the geographic restrictions and hazards that exist.

The system of the present invention also includes a field laptop workstation 3 for use by field technicians responsible for inspecting and maintaining the electric power transmission assets 14. In order to maintain the integrity of the information being maintained in the master database 1, the field laptop workstations 3 may interact with a quality assurance/quality control database 5 that is created from the master database 1. The quality assurance/quality control database 5 is also a commercially available database, such as ACCESS available from Microsoft Corporation. However, other commercially available databases may be used, such as ORACLE, SYBASE, or INFORMIX. The quality assurance/quality control database 5 is updated from the master database 1 as changes are applied to the master database 1. Prior to updating the master database 1, the TAMIS application software archives the most recent version of the master database 1 into a historical database 4.

The historical database 4 is a commercially available database, such as ACCESS, however, other commercially available databases may be used, such as ORACLE, SYBASE, or INFORMIX. Once the master database 1 has been archived to the historical database 4, changes may be made to the contents of the master database 1. After changes have been applied to the master database 1, the quality assurance/quality control database 5 is updated to reflect those changes.

The field laptop workstation 3 is used by the field technicians in performing their daily activities. The field laptop workstation 3 is equipped with a Global Positioning System (GPS) receiver that is attached to the field laptop workstation 3 through a serial port of the workstation 3. The GPS capability provides the field technicians with their exact present location. The GPS system receives a signal from Global Positioning System satellites 11, as described in White, R., "How Computers Work," Que Corporation, September 1999, Millennium Edition, pp. 270–271, the entire contents of which are incorporated herein by reference.

The field laptop workstation 3 is connected to the vehicle sound system (e.g., stereo system or multimedia system) of the field unit vehicle 12. The field laptop workstation 3 contains information from the master database 1, as replicated in the quality assurance/quality control database 5, resident on its storage device.

By having a real time exact position location as received from the GPS satellites 11, as well as detailed land restriction information as maintained in the master database 1, a copy of which is resident in the field laptop workstation 3, the remote users of the system are able to know where they are, where they are going, and what they need to avoid. The TAMIS application software, and the GIS application software, will generate audible warnings to the field technicians through their vehicle sound system if the current real time location of the vehicle, as determined by the GPS system, conflicts with a land restriction that has been defined in the master database 1. Having this capability, the field units can more efficiently perform their duties by having detailed routing information provided to them, as well as avoid problem areas such as areas with land ownership issues, environmentally sensitive areas, or areas that may pose a danger to the field technicians.

The field laptop workstation 3 is also equipped with an external compact disk drive 15, that can be used to access further information such as map or mechanical drawing information, or can be used to play audio CDs through the field vehicle 12 sound system. The field laptop workstation 3 is also equipped with an external removable storage device 16 that can be used to store a day's work (such as system assets that require maintenance actions) for backup purposes. The field laptop workstation 3 also includes the ability to receive images from a digital camera 13. The digital camera 13 may be used for taking digital pictures of particular problems with a transmission asset 14, or for other maintenance and inspection purposes.

When deployed in the field, the field laptop workstation 3 gains access to the quality assurance/quality control database 5 through a wireless modem 10. The wireless modem 10 provides the ability for the field inspection and maintenance crews to timely enter information into the quality assurance/quality control database 5.

The system of the present invention also includes a web server 6 that contains a quality assurance/quality control mirror database 7. The quality assurance/quality control mirror database 7 is made available in a format that allows browsing with any commercially available web browser tool such as INTERNET EXPLORER, available from Microsoft Corporation. The information in the quality assurance/quality control mirror database 7 could also be browsed with other commercially available browsers such as NETSCAPE NAVIGATOR, available from Netscape Communications Corporation. The web server 6 can be accessed from the network desktop workstation 2, as well as any other system with the appropriate connectivity. As changes are made to the quality assurance/quality control database 5 by the field laptop workstation 3 through the wireless modem 10, or by replicating the master database 1, they are immediately reflected in the quality assurance/quality control mirror database 7 residing on the web server 6.

Information integrity is maintained in the present invention through an automated quality assurance/quality control mechanism. All information that is maintained in the master database 1 has a corresponding responsible owner 9. The information maintained in the master database 1 is partitioned into logical groupings so that the ownership of the information can be distributed to the appropriate interested parties. Prior to modifying the information in the master database 1 with updates made from the field to the quality assurance/quality control database 5, the proposed changes are posted on the web server 6 in the quality assurance/quality control mirror database 7. As proposed changes to the master database 1 are posted on the quality assurance/quality control mirror database 7, an e-mail server 8 notifies the owner 9 responsible for the areas impacted by the proposed modification, by an e-mail message. The responsible owner 9 is responsible for reviewing the proposed modification, and approving the modification through a verification (or reply) e-mail message sent to the e-mail server 8. Upon verification by the owner 9, the TAMIS application software archives the current version of the master database 1 to the historical database 4, and then applies the verified changes from the quality assurance/quality control mirror database to the master database 1. After updating the master database 1 with the verified changes, the quality assurance/quality control database 5 is updated to reflect the most recent version of the master database 1. Similarly, the quality assurance/quality control mirror database 7, resident on the web server 6, is updated to reflect the most recent version of the master database 1.

Figure 2:
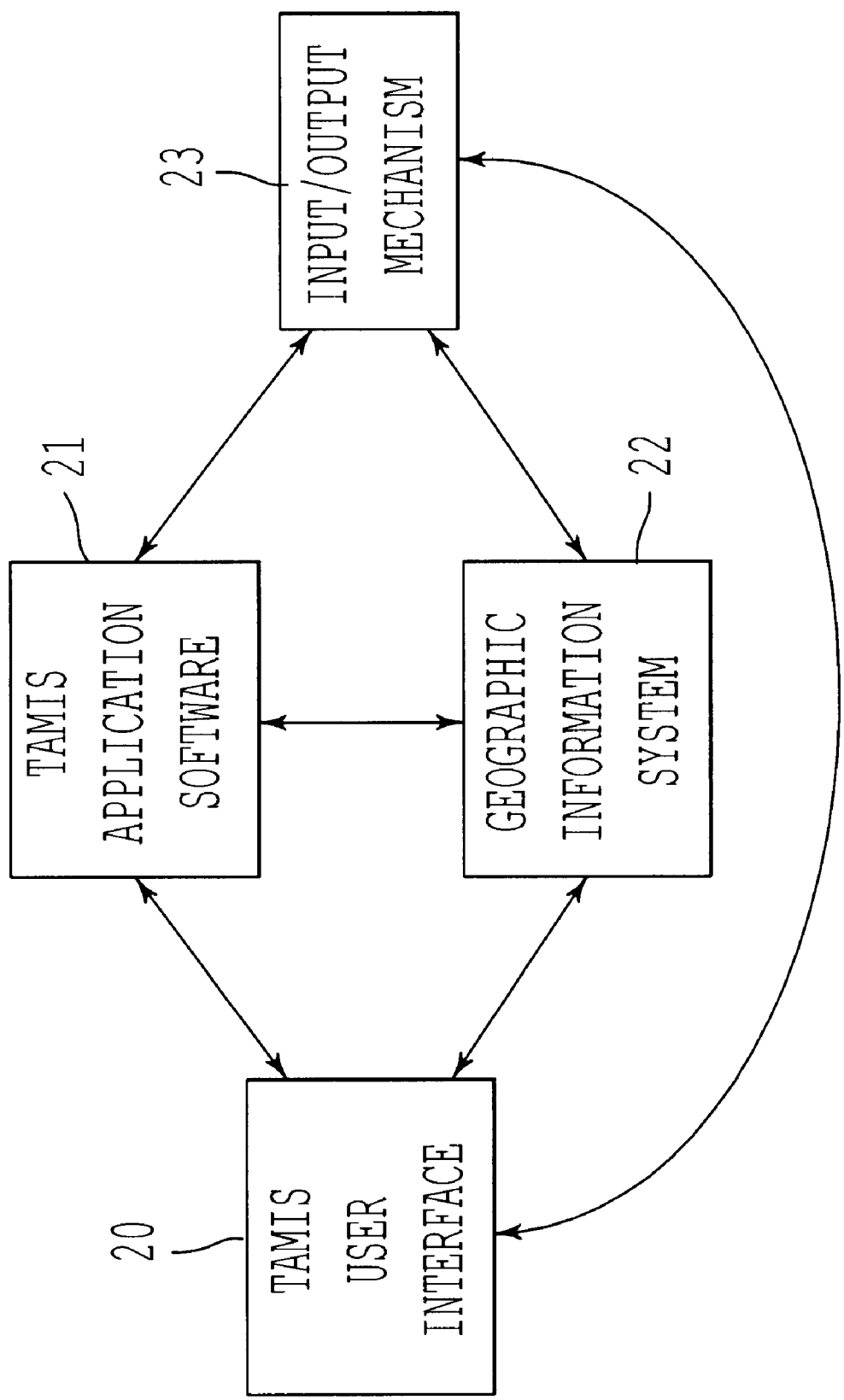
FIG. 2 is a block diagram showing mechanisms of a network desktop workstation and a field laptop workstation shown in FIG. 1.

FIG. 2 shows the mechanisms implemented by the network desktop workstation 2, and the field laptop workstation 3 in greater detail. The network desktop workstation 2, and the field laptop workstation 3 include a TAMIS user interface 20, TAMIS application software 21, geographic information system software 22, and an input/output mechanism 23. The TAMIS user interface 20 allows the users to interact with the master database. The TAMIS user interface 20 presents information to, and receives information from the user of the system and provides that information to the TAMIS application software 21 and geographic information system software 22 which will then manipulate or display the information in the master database 1 according to the user's direction. The input/output mechanism 23 provides a mechanism through which the application software can interact with external components. For example, the input/output mechanism 23 allows the TAMIS application software 21 to manipulate a database that resides on a network, allows the field laptop workstation 3 to receive real time location information from a GPS satellite 11, allows the field laptop workstation 3 to generate audible warnings to external devices such as the field unit vehicle 12, allows remote connectivity from the field laptop workstation 3 to the quality assurance/quality control database 5, and allows the TAMIS application software 21 to notify owners 9 of changes made to information for which they are responsible.

The TAMIS user interface 20 is developed to closely support the workflow of the particular users of the system. For example, an inspection and maintenance module of the TAMIS user interface 20 presents information to, and requests information from, the field technicians in accordance with their normal workflow. Similarly, modules of the TAMIS user interface 20 will be developed to closely match the workflow of those responsible for the central management of the transmission assets 14. This approach to developing the TAMIS user interface 20 provides more efficiencies to the management of geographically distributed assets and eases the transition to an automated management system.

The TAMIS application software 21 works closely with the geographic information system 22 in providing display information to the user through the TAMIS user interface 20. Furthermore, as the user inputs changes via the TAMIS user interface 20, the TAMIS application software 21 and geographic information system 22 are responsible for reflecting those changes in the master database 1.

Figure 3:
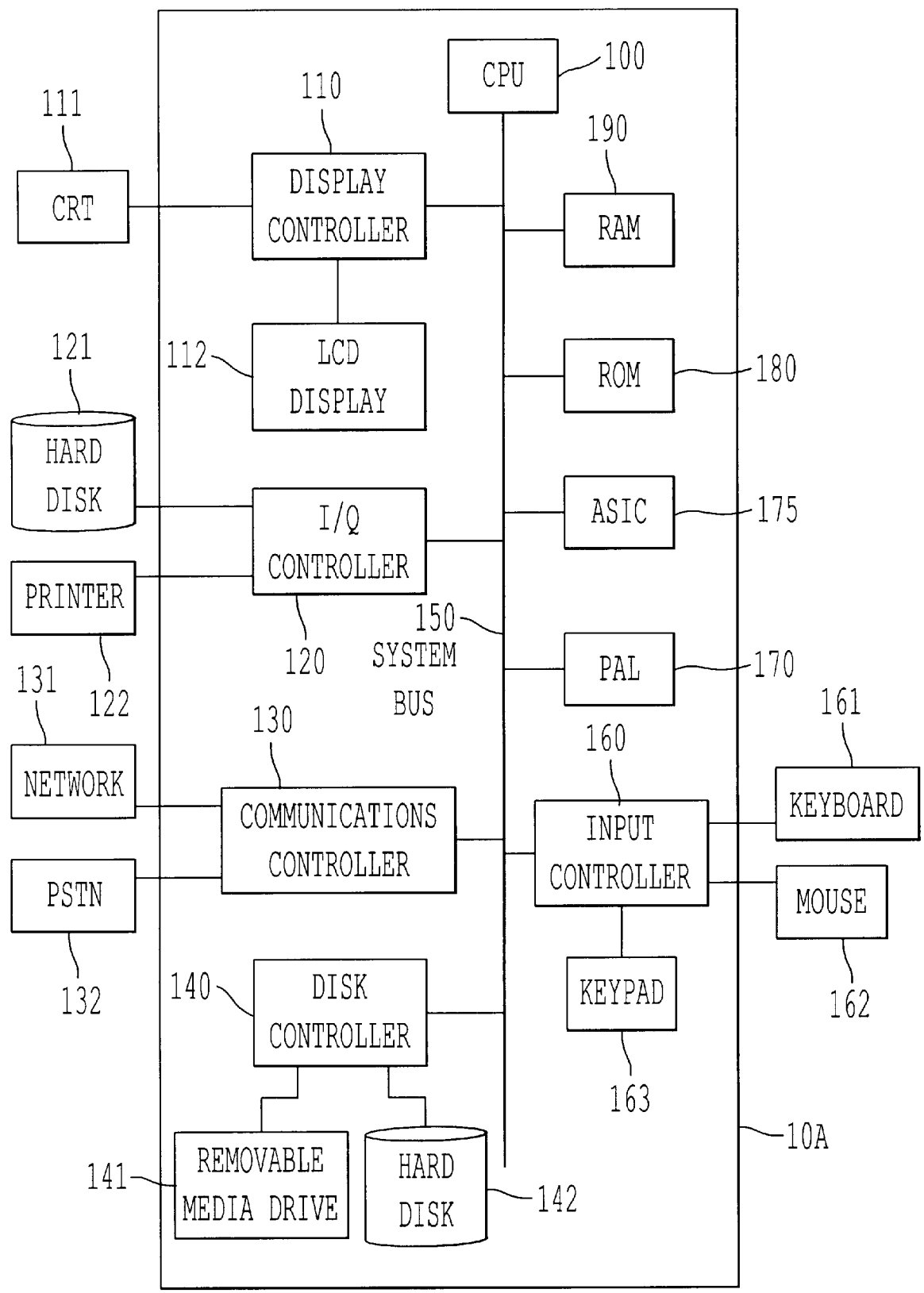
FIG. 3 is a schematic diagram of an electronics portion of the workstations used in the system.

FIG. 3 is a schematic diagram of an electronics portion 10A of the network desktop workstation 2 (although the structure of FIG. 3 also suitably describes an example of the field laptop workstation 3 or alternatively a cellular phone with a graphics display screen). The electronics portion 10A includes a system bus 150 that interconnects a variety of components that populate the system bus 150. A central processing unit (CPU) 100 is one component that populates the system bus 150 and provides general purpose control of the network desktop workstation 2, as well as bus administration functions for the system bus 150. The CPU 100 has available to it system random access memory (RAM) 190 for temporary storage use, non-volatile read only memory (ROM) 180 for program and parameter storage, and may also include an application specific integrated circuit (ASIC) 175, or programmable array logic (PAL) 170 for performing specialized data manipulation.

Alternatively, the ASIC 175 may be replaced/augmented with other data manipulation devices such as field programmable gate arrays (FPGA, not shown), programmable logic devices (PLDs, not shown) and other processing units (not shown). Also available as system resources are a disk controller 140, which controls a removable media drive 141 and a hard disk 142, and an input/output (I/O) controller 120, which controls an external hard disk 121 and an external printer 122. The external printer 122 may be used to print text, graphics, and data files output by the network desktop workstation 2.

The electronics portion 10A also includes an input controller 160 that controls an external keyboard 161, an external mouse 162, and optionally, a keypad 163. The input controller 160 receives input from the keyboard 161 and the mouse 162, although the optional keypad 163 may serve as an alternative input device.

The display controller 110 is used to control either, or both, of an external cathode ray tube (CRT) display 111 and an internal liquid crystal display (LCD) 112. Other display formats would also be suitable, including plasma displays, active and passive light emitting diode (LED) displays, etc. The displays 111 and 112, in tandem with the keyboard 161, and the mouse 162, (or optionally the keypad 163), serve a user interface function.

A communications controller 130 also resides on the system bus 150, and connects to an external network 131, and an external (or internal) public switch telephone network (PSTN) connection 132. The connection to the network 131 corresponds to the type of network to which the network desktop workstation 2 interfaces. The PSTN connection 132 is preferably in RJ-11 connection, although other connections are possible such as Integrated Services Data Network (ISDN) line connections, a broadband ISDN (b-ISDN) line connection, and a wireless access provider connection.

The TAMIS user interface 20 provides information and prompts to the user through the CRT 111 and the user provides input to the system through the keyboard 161 and mouse 162. The I/O controller 120 manages the input of information from external devices such as position data received from the GPS satellites 11, as well as information output through external devices such as the alarm information that can be output to the field vehicle 12 sound system. The TAMIS application software 21 and geographic information system 22 resides in the various memory elements of the electronics portion 10A and cause the CPU 100 to process the information received from the external devices and the user to provide the desired functionality, displays, and output.

Figures 4, 5:
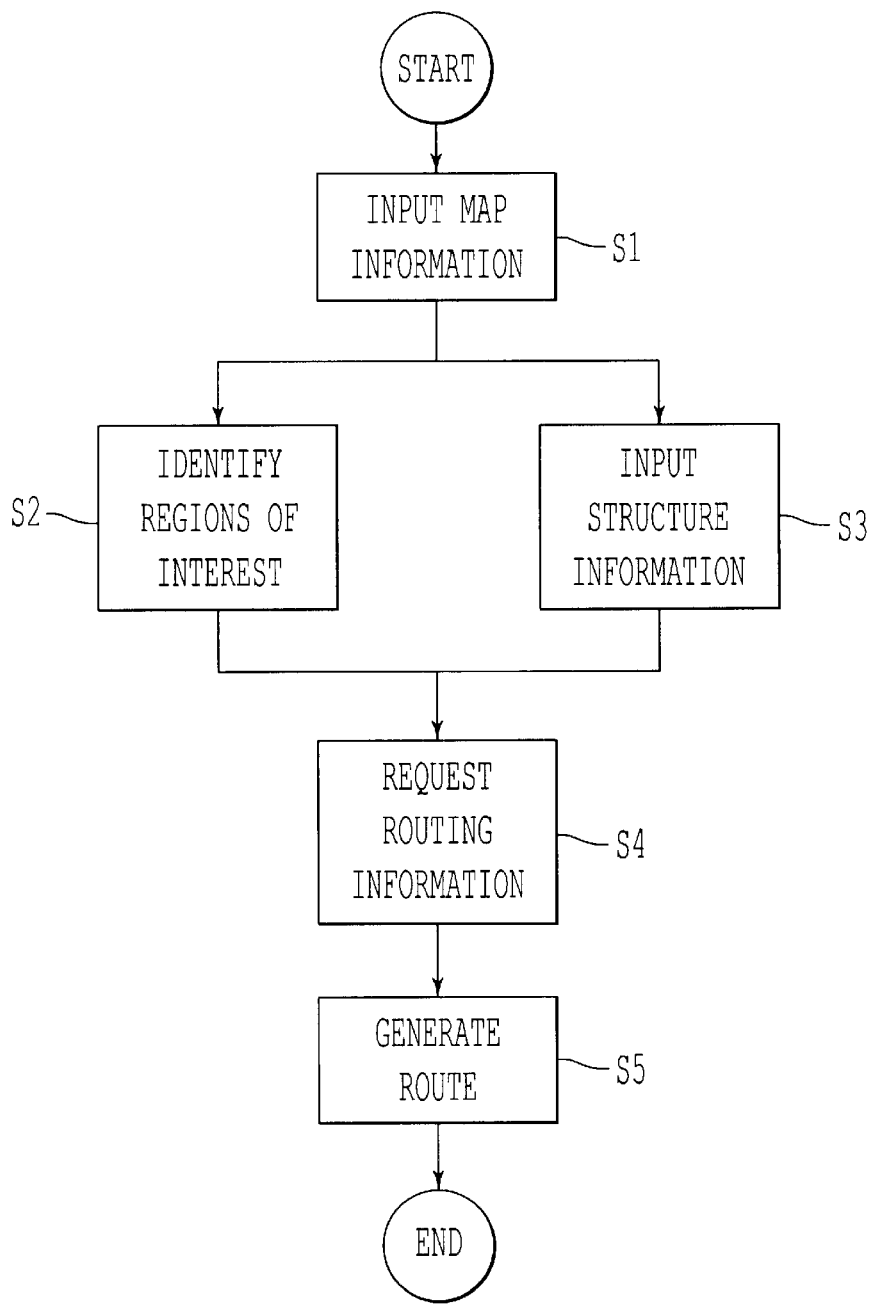
FIG. 4 is an exemplary data field structure in one embodiment of the present invention.
FIG. 5 is a flow diagram of a process to generate route information.

As described above, the master database 1 stores information that is useful to the field technicians responsible for inspecting and maintaining the geographically distributed assets. Similarly, the historical database 4, the quality assurance/quality control database 5, the quality assurance/quality control mirror database 7, and the information resident on the storage device of the field laptop workstation 3 also must store such useful information. A structure of the data fields stored in the databases, therefore, should include geographic information including a name of a region defined by a polygon, a geographic polygon definition, information concerning whether or not the region defined by the polygon should be avoided when determining a path to take to a remote asset, alarm information that should be displayed to the field technician when it is determined, based on real time positional information, that a forbidden region is about to be traversed, and alarm information that should be presented (visually, audibly, or tactiley) to the field technicians when it is determined, based on real time positional information, that the field technicians may be entering a region of danger. FIG. 4 shows the structure of one example of data fields in the databases.

FIG. 5 shows a process through which route information is generated for use by field technicians responsible for maintaining geographically distributed assets. As shown in FIG. 5, the process begins with step S1 where map information is input into the master database 1 using publicly available data such as USGS quad images. The process then proceeds to steps S2 and S3. At step S2, the user identifies regions of interest pertaining to land ownership, right-of-way, environmentally sensitive areas, Indian burial grounds, etc. using the geographic information system 22. The regions of interest defined at step S2 are stored with the map information in the master database 1. At step S3, information pertaining to the geographically distributed assets is populated into the master database 1 using the TAMIS application software 21 and the geographic information system 22. All information input into the system is geo-rectified so that the information can be relied on for accuracy. Once the geographic information, region information, and asset information is populated into the master database 1, the process proceeds to step S4. At step S4, the user can request routing information by indicating a starting location and the desired destination. The TAMIS application software 21 and geographic information system 22 accesses the information in the master database 1 to generate routing information at step S5. The routing information will take into account the roads that are available, the regions that must be avoided, as well as other constraints populated into the master database 1 and generate the most efficient route to follow from the starting point to the desired destination.

Figure 6:
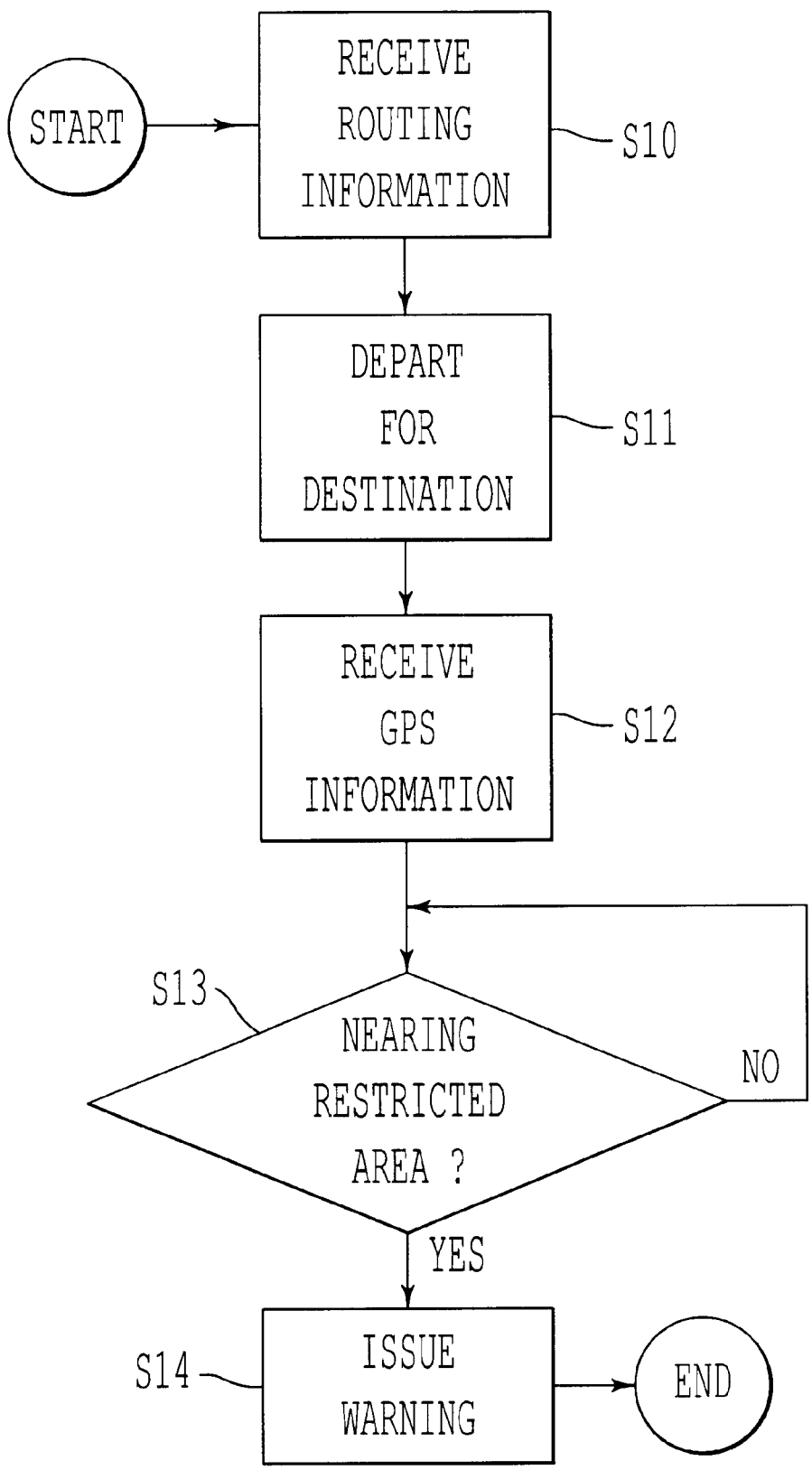
FIG. 6 is a flow diagram of a process to warn a field technician that a restricted area is about to be entered.

FIG. 6 shows a process through which routing information can be used by the field technicians responsible for maintaining geographically distributed assets to provide warning information so as to avoid restricted areas or otherwise dangerous areas. As shown in FIG. 6, the process begins at step S10 where the routing information is received from the process described in FIG. 5, above. Once a route has been determined from a starting point to a desired destination, the process proceeds to step S11 where the field technician departs for the destination following the route. While on the route, the process proceeds to step S12 where the field laptop workstation 3 receives GPS position information from a GPS satellite 11, as described above. The TAMIS application software 21 and the geographic information system 22 use the real time GPS position information to determine the field technician's current location with respect to the geographic information, the restricted areas information, and the asset location information that has been populated into the master database 1. The process then proceeds to step S13 where the TAMIS application software 21 and the geographic information system 22 determine whether a restricted area is being approached by the field technician. If a restricted area is not being approached, the TAMIS application software 21 and the geographic information system 22 continue to track the field technician's current position with respect to the path being taken to the destination. If, however, a restricted area is being approached, the process proceeds to step S14 where a warning is issued. The field laptop workstation 3 is wired to the field unit vehicle's 12 sound system so that an audible alarm can advise the driver that a restricted area is being entered. In another embodiment, the alarm could be a visual indicator displayed on the field laptop workstation 3. In yet another embodiment, the field unit vehicle 12 will report back its current position to the central office, and an appropriate alarm could be issued there as well.

Figure 7:
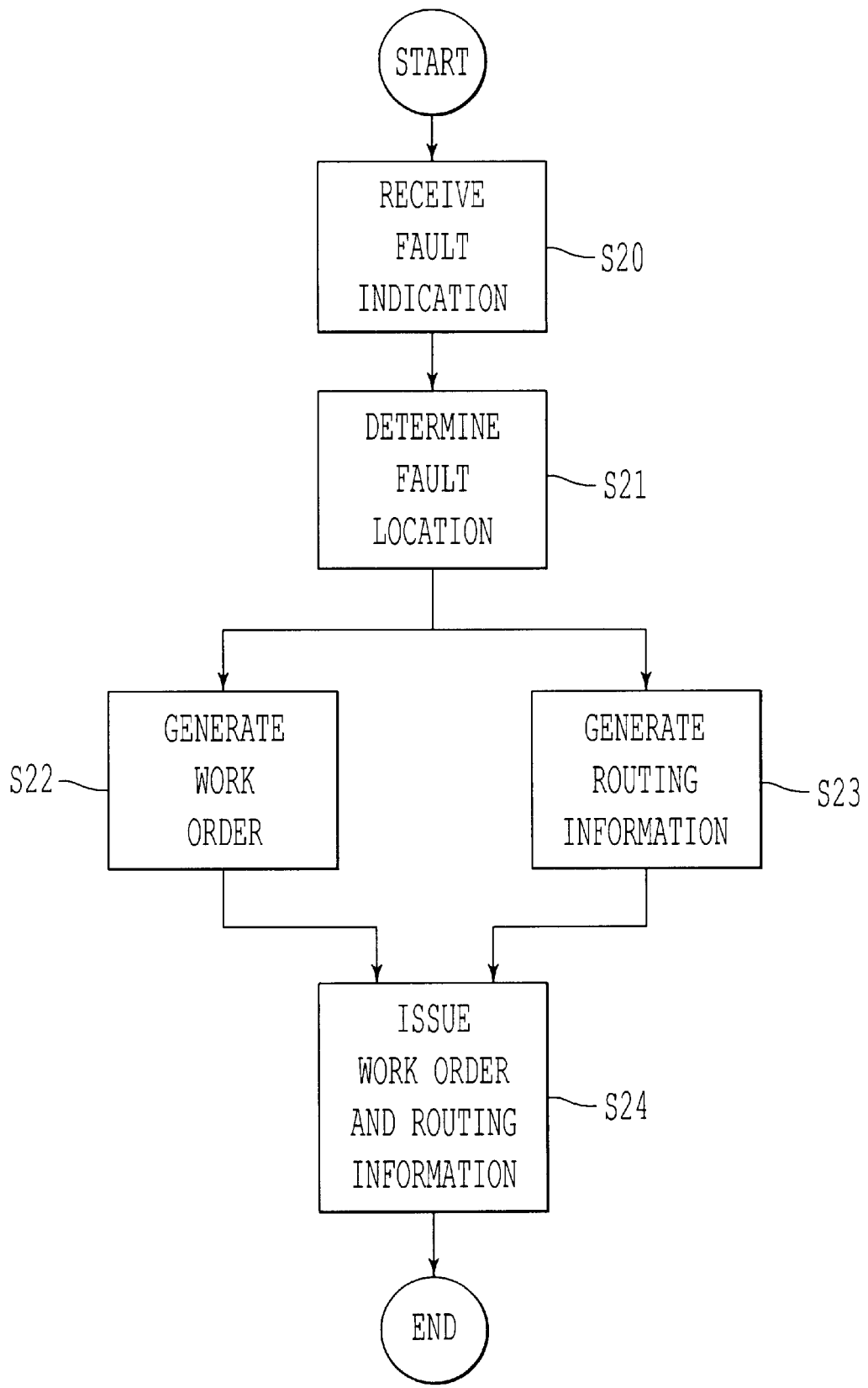
FIG. 7 is a flow diagram of a process to generate and issue work orders and routing information responsive to a fault indication.

FIG. 7 describes a process through which the maintenance of geographically distributed assets can be efficiently achieved. As shown in FIG. 7, the process begins at step S20 where a fault indication has been received. Fault indication can be accomplished through inspection, outage reports from customers, or through an automated means such as an annunciator. Once the fault indication has been received, the process proceeds to step S21 where the location of the fault is determined. The TAMIS application software 21 and the geographic information system 22 are used to provide a sub-meter GPS location of the location of the fault. Once the fault location has been determined, the process proceeds to steps S22 and S23. At step S22, a work order is generated that describes the problem encountered, as well as the asset needing repair. In step S23, routing information is determined based on the fault location identified in step S21 and using the process described in FIG. 6, above. Once a work order and routing information has been generated, the process proceeds to step S24 where the work order and routing information are issued to a field technician.

Figure 8:
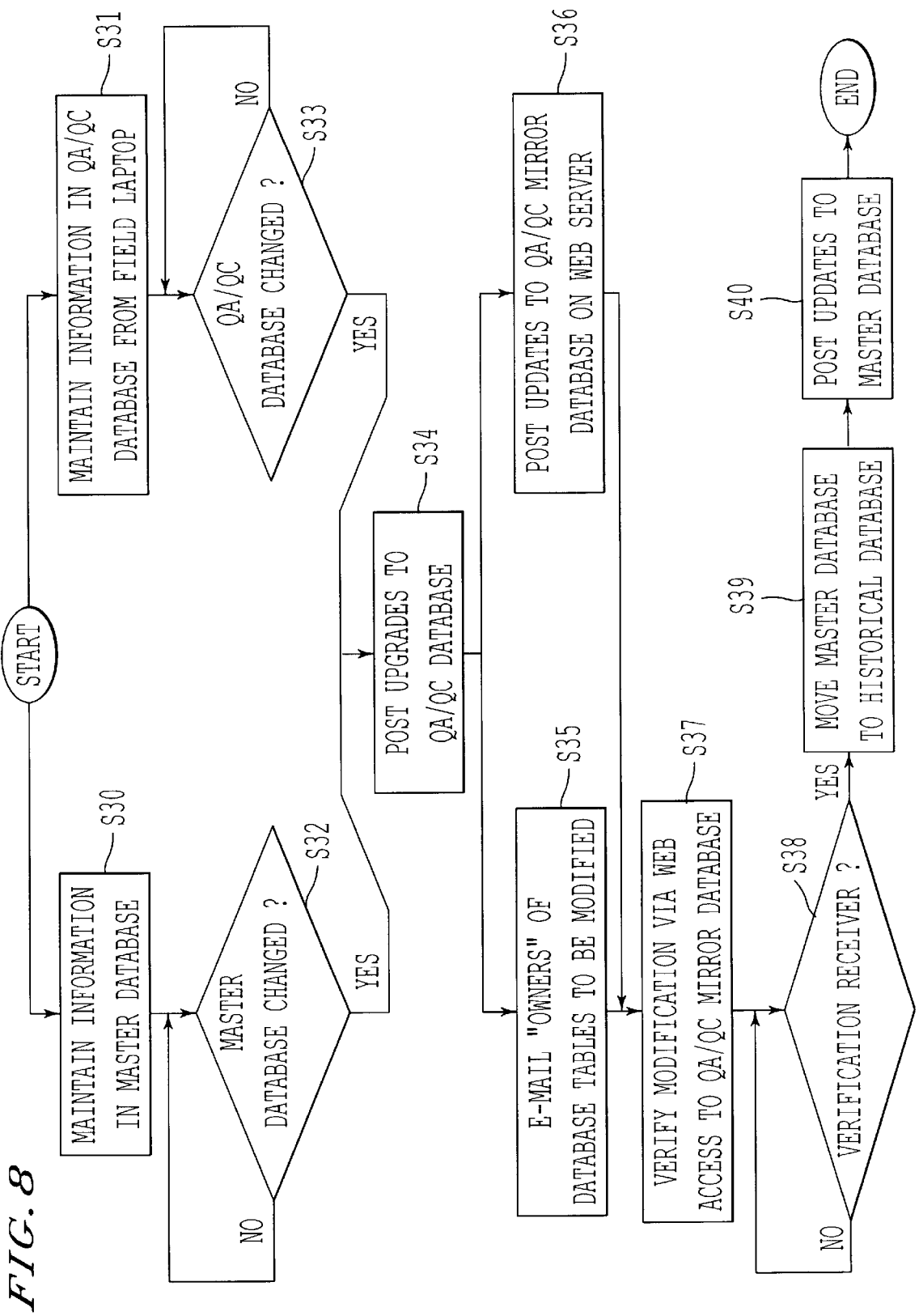
FIG. 8 is a flow diagram of a process to maintain an integrity of the information maintained in the master database.

In FIG. 8, the process by which the integrity of the information in the master database 1 can be maintained is described. As shown in FIG. 8, the process begins with steps S30 and S31. The step S30 represents the maintenance of information in the master database 1. The step S31 represents the maintenance of information in the quality assurance/quality control database 5 from the field laptop 3 as work is performed by the field technicians. As information is maintained in the databases, the process proceeds to steps S32 and S33. At step S32, the TAMIS application software 21 determines whether or not the master database 1 has been changed. If the master database 1 has been changed, the process proceeds to step S34, where the changes are posted to the quality assurance/quality control database 5. Similarly, the TAMIS application software 21 determines whether or not the quality assurance/quality control database 5 has been changed at step S33. If the quality assurance/quality control database 5 has been changed, the process proceeds to step S34, where those changes are posted to the quality assurance/quality control database 5. Once changes have been posted to the quality assurance/quality control database 5 at step S34, the process proceeds to steps S35 and S36. At step S35, the owners 9 of the database tables to which modifications are proposed, are issued an e-mail describing the proposed changes. In parallel with step S35, step S36 posts the updates that were proposed to the quality assurance/quality control database 5 to the quality assurance/quality control mirror database 7 on the web server 6. Once the quality assurance/quality control mirror database 7 has been updated, and the owners 9 of the database tables being modified have been notified, the process proceeds to step S37. At step S37, the owners 9 of the database tables being modified, verify the modifications by reviewing the proposed modifications on the quality assurance/quality control mirror database 7 on the web server 6. Access to the quality assurance/quality control mirror database 7 on the web server 6 requires only a commercially available web browser, as discussed above. The TAMIS application software 21 will determine when verification of proposed modifications has been given by the owners 9 at step S38. Once it has been determined that verification has been received at step S38, the process proceeds to step S39. At step S39, the TAMIS application software 21 will move the master database 1 version to the historical database 4 so that an audit trail of modifications is available. Once the backup has been made to the historical database 4, the process proceeds to step S40 where the TAMIS application software 21 posts the proposed updates as contained in the quality assurance/quality control database 5 to the master database 1.

Through detailed information collected by the inspection and maintenance crews, the master database 1 contents will provide valuable management information. For example, detailed historical records can be used to predict not only areas of concern for future failures of the geographically distributed assets, but also give insight into management information such as life cycle information on the assets, predictive budget information, as well as other management assessment and planning information.

The processes set forth in the present description may be implemented using a conventional general purpose microprocessor programmed according to the teachings in the present specification, as will be appreciated to those skilled in the relevant arts. Appropriate software coding can be readily prepared by skilled programmers based on the teachings of the present disclosure, as will also be apparent to those skilled in the relevant arts.

The present invention thus also includes a computer-based product which may be hosted on a storage medium and include instructions that can be used to program a computer to perform a process in accordance with the present invention. The storage medium can include, but is not limited to, any type of disk including floppy disks, optical disks, CD ROMs, magneto-optical disks, ROMs, RAMs, EPROMs, EEPROMs, flash-memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. A computer implemented system for managing geographically distributed assets, comprising:
   a master database populated with entries associated with said geographically distributed assets, said entries each being associated with one of the geographically distributed assets and having,
      an identification indicator,
      a geographic location indicator, and
      at least one characteristic attribute indicator;
   a processor; and
   a computer readable medium encoded with processor readable instructions that when executed by the processor implement,
      a geo-spatial query generating mechanism that generates a geo-spatial query containing at least one of the identification indicator, the geographic location indicator, and the at least one characteristic attribute associated with the subset of geographically distributed assets, and
      a selection mechanism configured to select a subset of the geographically distributed assets based on the geo-spatial query.

2. The system of claim 1, wherein:
   the geographically distributed assets comprise electric power transmission equipment.

3. The system of claim 1, wherein:
   said master database is further populated with entries having,
      a geographic definition of any restricted area within a predetermined distance from the geographically distributed assets.

4. The system of claim 3, wherein:
   said master database is further populated with map information.

5. The system of claim 4 wherein:
   said computer readable medium is further encoded with processor readable instructions that when executed by the processor further implements,
      a route generating mechanism configured to generate a route from a predetermined location to the geographically distributed assets avoiding the restricted areas.

6. The system of claim 1, further comprising:
   a mobile processor configured to access said master database.

7. The system of claim 6, wherein:
   said mobile processor includes a wireless modem configured to access said master database via a wireless communication channel.

8. The system of claim 6, wherein:
   said mobile processor includes a digital camera configured to store digital images in said master database as said at least one characteristic attribute indicator.

9. The system of claim 6, wherein:
   said mobile processor includes a removable media drive configured to store thereon query results.

10. The system of claim 6, wherein:
    said mobile processor is configured to generate and transmit audio signals associated with said at least one characteristic attribute indicator for the subset of geographically distributed assets from the geo-spatial query to a vehicle sound system connected to said mobile processor.

11. The system of claim 6, wherein:
    said mobile processor includes a removable media mass storage device configured to store thereon query results.

12. The system of claim 6, wherein:
    said mobile processor includes a global positioning system receiver configured to provide a real time position of said mobile processor.

13. The system of claim 12, wherein:
said master database is further populated with entries having,
   a geographic definition of any restricted area within a predetermined distance from the geographically distributed assets; and
said mobile processor is configured to generate an audible alarm indication to a vehicle sound system in response to said mobile processor determining that said real time position and said geographic definition of restricted areas are less than a predetermined margin.

14. The system of claim 12, wherein:
said mobile processor includes a wireless modem configured to transmit said real time position to said processor via a wireless communication channel.

15. The system of claim 6, wherein:
said mobile processor is configured to generate and display visual maps with visual representations of said subset of geographically distributed assets.

16. The system of claim 6, wherein:
said master database is further populated with entries having,
   a geographic definition of any restricted area within a predetermined distance from the geographically distributed assets; and
said mobile processor is configured to generate and display visual maps with visual representations of said subset of geographically distributed assets, and said geographic definition of restricted areas.

17. The system of claim 1, further comprising:
a historical database populated with prior versions of said master database.

18. The system of claim 6, further comprising:
a quality control database initially populated with a replica of a current version of said master database, wherein said mobile processor is configured to access and modify said quality control database.

19. The system of claim 18, further comprising:
a web server configured to perform data queries of said quality control database, wherein said quality control database is in a browsable format.

20. The system of claim 18, further comprising:
an e-mail server configured to generate a notification message when a modification is made to said quality control database, and configured to receive from a remote source an authorization message prior to irrevocably modifying said master database.

21. The system of claim 1, wherein:
said computer readable medium is further encoded with processor readable instructions that when executed by the processor further implements,
   a report generating mechanism configured to generate a report listing attributes of a subset of the geographically distributed assets.

22. A method of managing geographically distributed assets, comprising the steps of:
populating a master database with data that is descriptive of the geographically distributed assets, data pertaining to historical maintenance and inspection of the geographically distributed assets, geographic location of the geographically distributed assets, map information, and data identifying restricted areas within a predetermined distance from the geographically distributed assets;
generating route information indicating respective locations of restricted areas and candidate routes from a predetermined location to the geographically distributed assets; and
updating the master database from a remote location with updated maintenance and inspection information of the geographically distributed assets.

23. The method of claim 22, wherein:
the geographically distributed assets comprise electric power transmission equipment.

24. The method of claim 22, wherein the step of updating comprises:
populating a quality control database with the data in the master database; and
updating the quality control database from a remote location with updated maintenance and inspection information.

25. The method of claim 24, further comprising the steps of:
generating a notification message when updates are made to the quality control database;
receiving a verification message from a remote terminal of an update event;
copying the data in the master database to a historical database; and
updating the master database if said verification message indicates an approval of said update event.

26. The method of claim 22, further comprising the steps of:
accessing the data pertaining to historical maintenance and inspection of the geographically distributed assets in the master database;
processing the data pertaining to historical maintenance and inspection of the geographically distributed assets; and
generating a report listing attributes of a subset of the geographically distributed assets.

27. The method of claim 22, wherein the step of generating route information comprises:
generating and displaying visual maps on a display indicating respective locations of the geographically distributed assets, the route information, and the restricted areas;
receiving real time position information from a global positioning system receiver; and
generating an audible alarm when a current position of a vehicle in which the display is located and information from the master database indicate the vehicle is nearing an area that has been identified in the master database as a restricted area.

28. A system for managing geographically distributed assets, comprising:
means for populating a master database with data that is descriptive of the geographically distributed assets, data pertaining to historical maintenance and inspection of the geographically distributed assets, geographic location of the geographically distributed assets, map information, and data identifying restricted areas within a predetermined distance from the geographically distributed assets;
means for generating route information indicating respective locations of restricted areas and candidate routes from a predetermined location to the geographically distributed assets; and
means for updating the master database from a remote location with updated maintenance and inspection information of the geographically distributed assets.

29. The system of claim 28, wherein:

the geographically distributed assets comprise electric power transmission equipment.

30. A computer program product, comprising:

a computer storage medium and a computer program code mechanism embedded in the computer storage medium for causing a processor to facilitate the management of geographically distributed assets, the computer program code mechanism comprising:

a first computer code device configured to populate a master database with data that is descriptive of the geographically distributed assets, data pertaining to historical maintenance and inspection of the geographically distributed assets, geographic location of the geographically distributed assets, map information, and data identifying restricted areas within a predetermined distance from the geographically distributed assets;

a second computer code device configured to generate route information indicating respective locations of restricted areas and candidate routes from a predetermined location to the geographically distributed assets and configured to generate and display visual maps with visual representations of at least one of the route information, the restricted areas and the geographically distributed assets; and a third computer code device configured to update the master database from a remote location with updated maintenance and inspection information of the geographically distributed assets.

31. A mobile processor for facilitating a maintenance of geographically distributed assets comprising:

a wireless modem configured to convey a query message to a master database and configured to receive a reply message from said master database, said master database having entries associated with respective of said geographically distributed assets, said entries each including, an identification indicator, a geographic location indicator, at least one characteristic attribute indicator, and a geographic definition of any restricted area within a predetermined distance from each of the assets;

a processor; and a computer readable medium encoded with processor readable instructions that when executed by the processor implement, a geo-spatial query generating mechanism that generates a geo-spatial query containing at least one of the identification indicator, the geographic location indicator, and the at least one characteristic attribute associated with the subset of geographically distributed assets, and a selection mechanism configured to select a subset of the geographically distributed assets based on the geo-spatial query.

32. The apparatus of claim 31, wherein:

the geographically distributed assets comprise electric power transmission equipment.

33. The apparatus of claim 31, further comprising:

a digital camera, wherein:

said mobile processor is configured to store digital images from said digital camera.

34. The apparatus of claim 31, further comprising:

a removable media drive configured to store thereon query results.

35. The apparatus of claim 31, wherein:

said mobile processor is configured to generate and transmit audio signals associated with said at least one characteristic attribute indicator for the subset of geographically distributed assets from the geo-spatial query to a vehicle sound system connected to said mobile processor.

36. The apparatus of claim 31, further comprising:

a removable media mass storage device configured to store thereon query results.

37. The apparatus of claim 31, further comprising:

a global positioning system receiver configured to provide a real time position of said mobile processor.

38. The apparatus of claim 37, wherein:

said mobile processor is configured to generate an audible alarm indication to a vehicle sound system in response to said mobile processor determining that said real time position and said geographic definition of restricted areas are less than a predetermined margin.

39. The apparatus of claim 37, wherein:

said mobile processor includes a wireless modem configured to transmit said real time position via a wireless communication channel.

40. The apparatus of claim 31, wherein:

said mobile processor is configured to generate and display visual maps with visual representations of said subset of geographically distributed assets.

* * * * *